Nov. 28, 1967 J. W. TUSKA 3,355,598

INTEGRATED LOGIC ARRAYS EMPLOYING INSULATED-GATE FIELD-EFFECT DEVICES HAVING A COMMON SOURCE REGION AND SHARED GATES

Filed Nov. 25, 1964 3 Sheets-Sheet 1

INVENTOR

JAMES W. TUSKA

BY John V. Regan

Attorney

INVENTOR
JAMES W. TUSKA
BY John V. Regan
Attorney

INVENTOR.
JAMES W. TUSKA
BY John V. Regan
Attorney 3,355,598
Patented Nov. 28, 1967

3,355,598

INTEGRATED LOGIC ARRAYS EMPLOYING INSULATED-GATE FIELD-EFFECT DEVICES HAVING A COMMON SOURCE REGION AND SHARED GATES

James W. Tuska, Hopewell Township, Mercer County, N.J., assignor to Radio Corporation of America, a corporation of Delaware Filed Nov. 25, 1964, Ser. No. 413,780
8 Claims. (Cl. 307—88.5)

ABSTRACT OF THE DISCLOSURE

Disclosed herein are integrated decoders employing insulated-gate field-effect devices having multiple gates and a common source. One or more gates are common to more than one device, and gate extensions are brought out between neighboring drains in a manner which prevents sneak paths between neighboring drains.

This invention relates to logic arrays and, in particular, to multi-level decoders and the like that can be fabricated as an integrated single unit which is simpler than an equivalent array of interconnected individual units.

A decoder is a device having a plurality of independent inputs and a greater plurality of outputs, characterized in that a different output is energized for each different combination of independent inputs. By definition, the outputs of decoders are mutually exclusive. When the decoding is performed in a single level of logic, the separate switching device associated with each output is connected to receive all of the independent inputs. The number of inputs per device can be reduced by resorting to a multi-level logic scheme in which only a portion of the independent inputs are supplied to the devices in the first level of logic, and in which the outputs of the devices in the first level and others of the independent inputs are applied in different combinations to the devices in the second level of logic, and so forth. The latter scheme generally is employed when the number of independent inputs is large. However, the reduction in the number of inputs per device in the latter scheme is achieved at the expense of an increase in the total number of devices and circuit interconnections.

It is one object of the present invention to provide improved decoders and similar devices which can be fabricated in integrated form and which are simpler in construction than their logical equivalents using individual interconnected units.

It is another object of this invention to provide improved decoders and similar type devices which require fewer components than prior art devices performing the same function.

It is still another object of this invention to provide means for eliminating, or at least reducing, interaction between adjacent semiconductor field-effect devices fabricated in integrated form on the same substrate.

A decoder embodying the invention comprises a body of semiconductive material having a common source and a plurality of spaced drains in contact with the body. Each drain defines one end of a different current carrying, or conduction, path in the body and the common source defines the other end of each of the conduction paths. Different sets of gate electrodes overlie and are insulated from each different conduction path. At least one gate electrode of each set is integral with a gate electrode of at least one other set. The gate electrodes are arranged so that only one complete set of gate electrodes is "energized" for any one set of input conditions.

In one embodiment of the invention, input connections to some of the gate electrodes are made by way of conductors in the form of gate extensions which are insulated from and which overlie a portion of the semiconductive body between two neighboring drains. The conductors are arranged so that when they are brought out between neighboring drains, conductors associated with at least two nonsimultaneously energized gate electrodes are brought out between a pair of neighboring drains. By this means, interaction is avoided between neighboring drains when input signals are applied to the gate electrodes.

In the accompanying drawing, like reference characters denote like components; and FIGURE 1 is a schematic diagram of a multi-level decoder employing individual transistor elements in accordance with the general teachings of the prior art;

The devices contemplated for use in practicing the invention are of a type known in the art as insulated-gate, field effect transistors. Such a transistor may be defined generally as a majority carrier device that comprises a body of semiconductive material having a source and a drain contacting the body and defining the ends of a conduction, or current carrying path in the body. In the usual type device, a single gate (control) electrode overlies at least a portion of the conduction path and is separated therefrom by an insulator or region of insulating material. Since the gate is insulated from the body of semiconductive material, it draws little or no current under steady state operating conditions. Signals or voltages applied to the gate electrode control the impedance of the conduction path. In practicing the present invention, insulated-gate, field-effect devices having a plurality of gate electrodes spaced along the conduction path and insulated therefrom are employed.

Two known types of insulated-gate, field-effect transistors are the thin-film transistor (TFT) and the metal-oxide semiconductor (MOS). Some of the physical and operating characteristics of a TFT are described in the article "The TFT—A New Thin-Film Transistor," by P. K. Weimer, appearing at pp. 1462–1469 of the June 1962 issue of the Proceedings of the IRE. The MOS transistor is described in an article entitled, "The Silicon Insulated-Gate Field-Effect Transistor," by S. R. Hofstein and F. P. Heiman, in the September, 1963 issue of the Proceedings of the IEEE at pp. 1190–1202.

Insulated-gate, field-effect transistors may be of either the enhancement or the depletion type. In an enhancement type unit the impedance of the conduction path is very high when the gate and source voltages have the same value. A signal of the proper polarity applied between gate and source decreases the impedance of the conduction path. In a depletion type unit, the impedance of the conduction path is low, relatively speaking, when the source and gate have the same voltage. Input signals of the proper polarity applied between source and drain increase the impedance of the conduction path. For reasons which will be discussed hereinafter, transistors of the enhancement type are preferred for use in practicing the invention.

Figure 1:
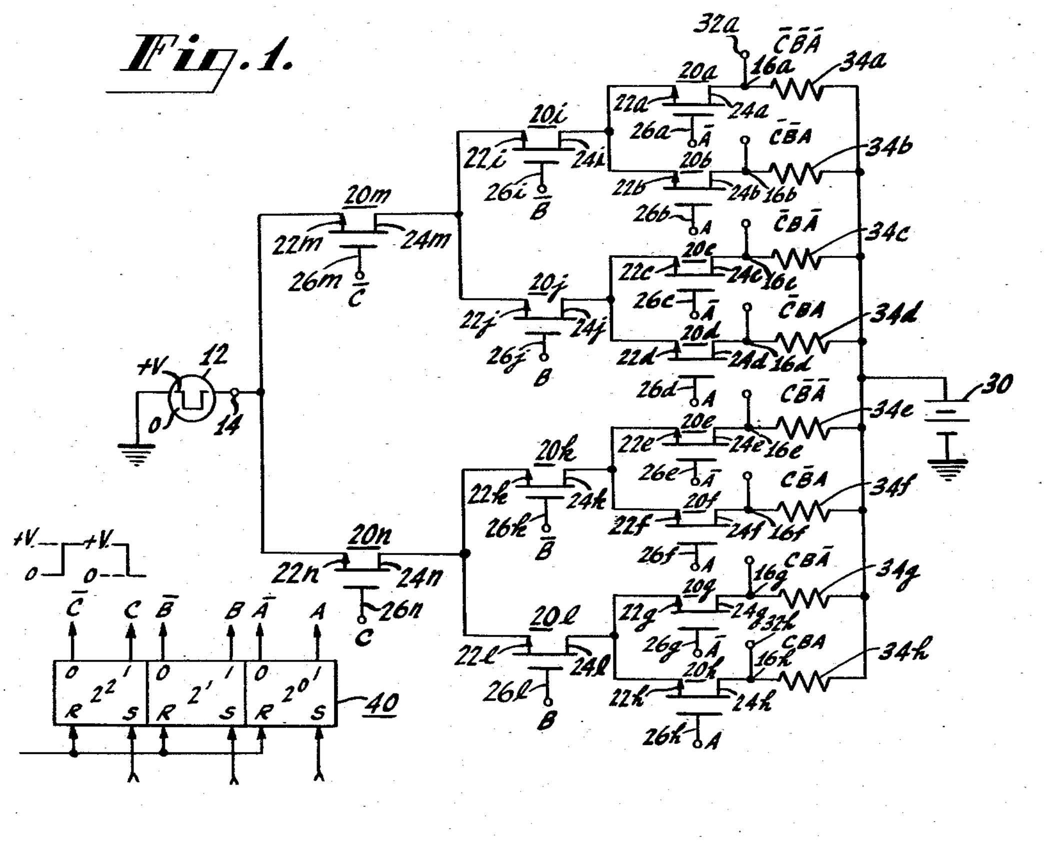

FIGURE 1 is a drawing, partly in schematic and partly in block form, of a multi-level binary-to-decimal decoder employing individual transistors connected in an arrangement according to the general principles of the prior art. The transistors are illustrated as being insulated-gate, field-effect transistors for the purpose of comparing this arrangement with the arrangements embodying the invention and to be described.

In the FIGURE 1 arrangement, which is a type of "transfer tree," control signals from a source 12 are applied between circuit ground and an input terminal 14. A plurality of insulated-gate, field-effect transistors 20*a* . . . 20*n* of the same conductivity type are connected in three levels of logic to provide a number of different signal paths each for selectively coupling input terminal 14 to a different one of a group of output junctions 16*a* . . . 16*n*. The third or last logic level comprises eight transistors 20*a* . . . 20*h* having their respective drain electrodes 24*a* . . . 24*h* connected to the output junctions 16*a* . . . 16*h*, respectively. A separate resistor 34*a* . . . 34*h* may be connected between each of the output terminals 16*a* . . . 16*h*, respectively, and the positive terminal of a source of suitable operating voltage, illustrated as a battery 30 having its negative terminal grounded. A separate output terminal 32*a* . . . 32*h* is connected to each different output junction 16*a* . . . 16*h*, respectively.

The second or middle logic level comprises four transistors 20*i* . . . 20*l*, and the first level of logic comprises two transistors 20*m*, 20*n*. Transistor 20*i* has its drain electrode 24*i* connected to the source electrodes 22*a* and 22*b* of the transistors 20*a* and 20*b* and, in turn, has its source electrode 22*i* connected to the drain electrode 24*m* of transistor 20*m*. Drain electrode 24*m* also is connected to the source electrode 22*j* of transistor 20*j*, the drain electrode 24*j* of which is connected to the source electrodes 22*c* and 22*d* of transistors 20*c* and 20*d*. In like manner, the other transistor 20*n* in the first logic level has its drain electrode 24*n* coupled by way of transistors 20*k* and 20*l* to the source electrodes 22*e* and 22*f* of transistors 20*e* and 20*f*, and the source electrodes 22*g* and 22*h* of transistors 20*g* and 20*h*, respectively. The source electrodes 22*m* and 22*n* of transistors 20*m* and 20*n* are connected to the input terminal 14.

Each of the transistors 20*a* . . . 20*n* has a single gate electrode to which information signals are applied. In particular, the gate electrode 26*n* of transistor 20*n* receives a logic signal designated "C," which may be a signal or level representing either a binary "1" or a binary "0." The gate 26*m* of the other transistor 20*m* in the first logic level receives a signal $\overline{C}$, which is the binary complement of the signal C. In like manner, the gates of half the transistors in the second logic level, namely gates 26*j* and 26*l* receive information signals B and the other half receive the complement signals $\overline{B}$. Signals A are applied to the gate electrodes 26*b*, 26*d*, 26*f* and 26*h* in the third logic level and the complement signals $\overline{A}$ are applied to the gates 26*a*, 26*c*, 26*e* and 26*g*. Thus, three sets of information signals are supplied as inputs to the decoder, each set being independent of the other sets, but the two signals of a set being complementary and hence interdependent.

The information signals may be supplied, for example, by a data register 40 having three bistable stages. The outputs appearing at the (0) and (1) output terminals of a stage are the binary complements of one another. Thus, when the output A of the $2^0$ stage is a signal or level representing binary "0," the other output $\overline{A}$ is a signal or level representing a binary "1," and vice-versa. The outputs of the various register 40 stages are applied at the like designated points in the decoder; the connections are omitted for clarity of drawing. By way of example, the $\overline{B}$ output of the $2^1$ stage is applied at the gate electrodes 26*i* and 26*k* of transistors 20*i* and 20*k*.

All of the transistors 20*a* . . . 20*n* are illustrated as being of n-type conductivity and are of the enhancement type. The conduction path of such a transistor has a very high impedance when its gate voltage is equal to or less positive than its source voltage, and has a very low impedance when its gate voltage exceeds its source voltage a sufficient amount. In this application, the transistors operate essentially as switches having either an open or closed condition. For reasons which will become apparent, the register 40 preferably is one providing outputs of either +V volts or zero volts, corresponding respectively to binary "1" and "0."

Consider now the operation of the decoder. Control source 12 supplies an input of either +V volts or zero volts at input terminal 14. With a control input of +V volts, all of the transistors 20*a* . . . 20*n* are biased "off" since the most positive voltage at any gate electrode thereof is +V volts. Neglecting the very small leakage current that may flow through various ones of the transistors, the voltage at each of the output junctions 16*a* . . . 16*h* and output terminals 32*a* . . . 32*h* has a value equal to the battery 30 voltage.

The control voltage supplied by source 12 is switched to zero volts when a decoding operation is to take place. With a control input of zero volts, a low impedance path is provided between input terminal 14 and an output junction only if all of the transistors connected in series therebetween receive inputs of +V volts on their respective gate electrodes. The gate electrodes 26*a* . . . 26*n* are so connected to the register 40 outputs that only one complete series set of transistors will provide a low impedance path between input terminal 14 and an output junction for any one set of register outputs.

By way of example, take the condition where the information signals $\overline{A}$, $\overline{B}$ and $\overline{C}$ are all +V volts. The other signals A, B and C then are zero volts. Transistors 20*a*, 20*i* and 20*m* then have +V volts applied at their respective gate electrodes 26*a*, 26*i* and 26*m*, and a low impedance path appears between input terminal 14 and output junction 16*a*. Current flows from the positive terminal of battery 30 through resistor 34*a*, the conduction paths of transistors 20*a*, 20*i* and 20*m*, and through control source 12 to ground. Assuming that the value of resistor 34*a* is very high relative to the series impedance of transistors 20*a*, 20*i* and 20*m*, the voltage at output terminal 32*a* will be approximately ground potential. The legend $\overline{C}\,\overline{B}\,\overline{A}$ appearing adjacent this terminal has the meaning that an output (zero volts) appears at that terminal when the inputs C, B and A are all binary "0." Since the decimal equivalent of this binary combination is "0," output terminal 32*a* may be considered the decimal "0" output terminal in a binary-to-decimal decoding application.

By observing the input signals applied at the gate electrodes of the various transistors, it can be seen that at least one transistor in each of the other series paths has zero volts applied to its gate electrode for the aforementioned input signal condition. In particular, transistors 20*b*, 20*d*, 20*f*, 20*h*, 20*j*, 20*l* and 20*n* have zero volts applied at their respective gate electrodes, whereby these transistors are biased "off" and there is no low impedance path between any of the output junctions 16*b* . . . 16*h* and input terminal 14. By similar reasoning, it can be verified that an output appears at a different output junction 16*a* . . . 16*h* and corresponding output terminal 32*a* . . . 32*h* for each different set of signals supplied by the register 40. The output junctions at which an output appears for the various input signal conditions are summarized in the following table.

TABLE I

| Register 40 Outputs | | | | | | Output Junction |
|---|---|---|---|---|---|---|
| C | $\overline{C}$ | B | $\overline{B}$ | A | $\overline{A}$ | |
| 0 | 1 | 0 | 1 | 0 | 1 | 16a |
| 0 | 1 | 0 | 1 | 1 | 0 | 16b |
| 0 | 1 | 1 | 0 | 0 | 1 | 16c |
| 0 | 1 | 1 | 0 | 1 | 0 | 16d |
| 1 | 0 | 0 | 1 | 0 | 1 | 16e |
| 1 | 0 | 0 | 1 | 1 | 0 | 16f |
| 1 | 0 | 1 | 0 | 0 | 1 | 16g |
| 1 | 0 | 1 | 0 | 1 | 0 | 16h |

The decoder illustrated in FIGURE 1 is useful as a binary-to-decimal decoder. By definition, a binary-to-decimal decoder is one having $n$ independent inputs and $2^n$ outputs. Although only three register stages are illustrated, whereby the decoder may have eight outputs, it is within the skill of the art to provide a register having a greater number of stages and to extend the decoder accordingly. It will be observed, however, that the number of individual transistors increases by a factor of two from one level of logic to the next and that the number of individual transistors becomes large when a large number of logic levels are employed. This also means that the number of interconnections between transistors, and between the gate electrodes thereof and the register 40 also becomes large, which is especially disadvantageous when the decoder is integrated. These disadvantages are overcome by a decoder embodying the invention which will now be described.

Figure 2:
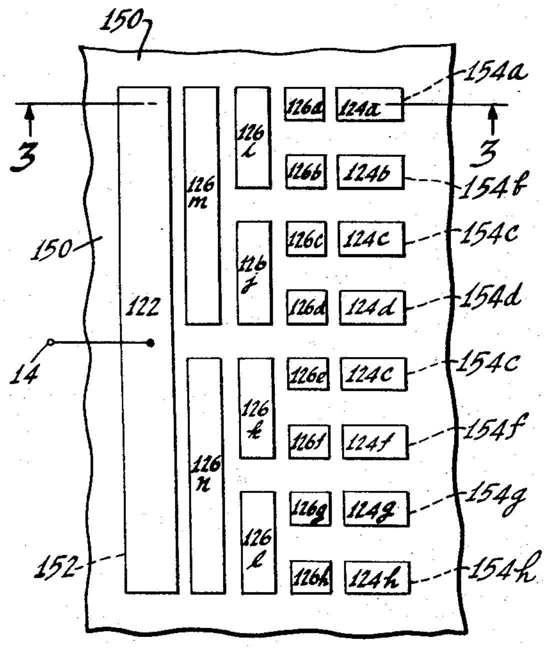
FIGURE 2 is a plan view of a decoder unit embodying the invention.

FIGURE 2 is a plan view of one integrated decoder embodying the invention, which decoder may replace the plurality of transistors 20*a* . . . 20*n* in FIGURE 1. The decoder elements in FIGURE 2 are given reference characters in the 100 series, and the reference characters of those elements which are functionally equivalent to gate and drain electrodes in the FIGURE 1 arrangement have the same tens and units digits and alphabetic character as the latter electrodes. Although the register 40, control source 12, battery 30, gate input leads and output circuitry are omitted in FIGURE 2 for clarity of drawing, it will be understood that the various elements may be connected to the same circuit points as their counterpart elements in FIGURE 1.

The FIGURE 2 decoder, illustrated as comprising MOS units, includes a body 150 of p-type semiconductor material having a common, elongated source 152 of n-type material and a plurality (eight shown) of individual n-type drains 154*a* . . . 154*h* contacting the body 150. A metallic source electrode 122 overlies the source 152 and is in ohmic contact therewith. A separate metallic drain electrode 124*a* . . . 124*h* overlies each of the drains 154*a* . . . 154*n*. Alternatively, the body 150 could be of n-type conductivity and the source and drain regions 152 and 154*a* . . . 154*h* could be of p-type conductivity. For a TFT unit, on the other hand, the metallic electrodes 122 and 124*a* . . . 124*h* themselves are the source and drains, respectively, and there are no separate semiconductive source 152 and drains 152*a* . . . 152*h*.

Figure 3:
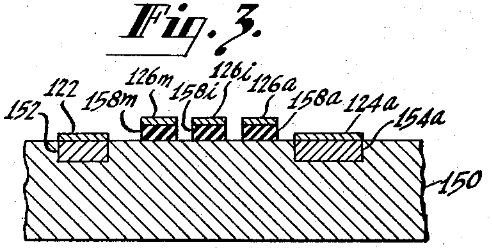
FIGURE 3 is a cross-sectional view in side elevation taken along the lines 3—3 of FIGURE 2.

Details of the source and drain and their associated electrodes may best be seen in FIGURE 3, which is a cross-sectional view taken along the line 3—3 of FIGURE 2. FIGURE 3 is illustrative of the relation of the source 152 and drain 154*a* to the body 150, and the relation of the source electrode 122 and drain electrode 124*a* to the common source 152 and the drain 154*a*, respectively. The drains 154*a* . . . 154*n*, which preferably are equally spaced from the common source 152, each define one end of a different conduction path in the body 150. Common source 152 defines the other end of each such conduction path.

A different set of three gate electrodes is associated with each conduction path. The three electrodes of a set overlie their conduction path and are insulated therefrom. As shown in FIGURE 3, for example, three gate electrodes 126*m*, 126*i* and 126*a* overlie the conduction path between common source 152 and drain 154*a* and are spaced from one another along the length of the conduction path. Each of the gate electrodes 126*m*, 126*i* and 126*a* is spaced from the conduction path in the body 150 by a separate region 158*m*, 158*i* and 158*a* of insulating material which may be, for example, silicon dioxide. Alternatively, the three electrodes 126*m*, 126*i* and 126*a* could be deposited on a single, continuous insulator rather than the separate insulators illustrated. The conduction path has a very high impedance when the voltage at any gate electrode 126*m*, 126*i* or 126*a* is equal to or less positive than the voltage applied to the source electrode 122.

In addition to employing a single source 152 and source electrode 122, it should be noted in FIGURE 2 that various ones of the gate electrodes in any set are integral with gate electrodes in other sets. For example, gate electrode 126*m* is an elongated electrode that is common to, and overlies the conduction paths associated with the four drains 154*a* . . . 154*d* and their associated electrodes 124*a* . . . 124*d*, respectively. Gate electrode 126*i* is an elongated electrode that overlies the conduction paths associated with the pair of drains 154*a* and 154*b*.

The operation of the FIGURE 2 device is similar to that of the FIGURE 1 decoder when connected to the same input and output circuitry. In particular, when the various gate electrodes 126*a* . . . 126*n* are connected to the same register 40 outputs as the gate electrodes 26*a* . . . 26*n*, respectively, in FIGURE 1, the three gate electrodes of only one complete set will receive voltages of +V volts at any given time. The impedance of the associated conduction path will be low, and the output at the associated drain electrode will be close to ground potential. At least one of the gate electrodes in each of the other sets will be at ground potential, whereby all of their associated conduction paths will have a very high impedance.

The FIGURE 2 decoder has the advantage over the FIGURE 1 decoder that fewer components are required. The FIGURE 1 decoder requires fourteen individual transistors to perform the same decoding function that is performed by the "equivalent" of eight integrated transistors in the FIGURE 2 device. Moreover, the component count in the FIGURE 2 device is even less than that of eight transistors since only one source 152 is employed, and many of the gate electrodes are common to more than one conduction path. These features lead to easier fabrication, relaxed tolerances in the fabrication process and less expensive masks for use in fabricating the decoder as compared to a decoder employing individual transistors. Moreover, the number of internal connections in the decoder itself is greatly reduced.

One feature of the FIGURE 2 device that may be disadvantageous in some applications is that the three gate electrodes of any set do not completely overlie their associated conduction path. Referring to FIGURE 3, it may be seen that the conduction path between common source 152 and the drain 154*a* is not "covered" by a gate electrode in the region between source 152 and gate electrode 126*m*, in the regions between the gate electrodes, and between gate electrode 126*a* and drain 154*a*. These "uncovered" portions of the conduction path have a higher impedance than the covered portions when all of the gates 126*m*, 126*i* and 126*a* are at +V volts, whereby the voltage at drain electrode 124*a* may not be at ground potential for this input condition. This situation is avoided by arranging the three gate electrodes of each set to completely overlie the entire conduction path associated therewith, as in the embodiment of FIGURES 4 and 5.

Figure 4:
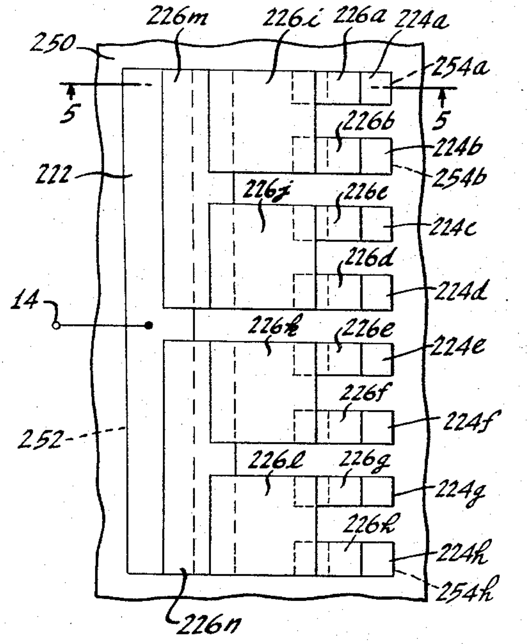
FIGURE 4 is a plan view of another embodiment of the invention which is a modification of the decoder unit of FIGURE 2.

In FIGURE 4, the decoder elements are given reference characters in the 200 series, with the reference characters of the various elements having the same tens and units digits and alphabetic characters as their counterparts in the FIGURE 1 and FIGURE 2 arrangements. The device of FIGURE 4 differs structurally from the device of FIGURE 2 only in that each of the gate electrodes 226*m* and 226*n* overlies an adjacent portion of the common source 252, each of the gate electrodes 226*a* . . . 226*h* overlies a portion of the associated drain 254*a* . . . 254*h*, and each of the gate electrodes 226*i* . . . 226*l* overlies the remaining portions of its associated conduction paths and portions of adjacent gate electrodes to the left and right. This may best be seen in FIGURE 5, which is a cross-sectional view taken along the lines 5—5 of FIGURE 4.

Figure 5:
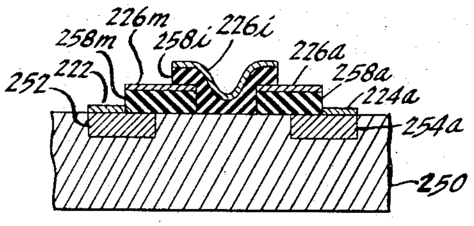
FIGURE 5 is a cross-sectional view in side elevation taken along the lines 5—5 of FIGURE 4.

As seen in FIGURE 5, gate electrode 226*m* overlies an adjacent portion of common source 252 and a portion of the conduction path, being insulated from both by a region of insulating material 258*m*. Gate electrode 226*a* overlies a portion of its associated drain 254*a* and a portion of the conduction path, being insulated from both by an insulator 258*a*. The remaining, middle gate electrode 226*i* overlies the remaining portion of the conduction path and portions of each of the other gate electrodes 258*a* and 258*m*, being insulated from all by an insulator 258*i*. The remaining portion of the source 252 is covered by a metallic source electrode 222, and a metallic drain electrode 224*a* covers the remaining portion of the drain 254*a*. In each of the embodiments to be described hereinafter, the gate electrodes are shown for convenience and for clarity of drawing as being spaced from one another and from the source and drain. It should be understood, however, that the various sets of gates may overlie their entire conduction paths, as in FIGURE 4, and that such arrangement of the gate electrodes is contemplated.

An important consideration in integrated circuits is the method of making circuit interconnections. In the case of the decoder of FIGURE 2, for example, a connection must be made between each of the gate electrodes 126*a* . . . 126*n* and the appropriate output of the register 40 (FIGURE 1). In a truly integrated system, it is desired that these interconnections be made by the deposition of conductors rather than by lengths of discrete wires, as in the case of non-integrated circuits. Connections to the gate electrodes 126*a*, 126*h*, 126*i*, 126*l*, 126*m* and 126*n* (FIGURE 2) pose no problem since each of these electrodes has a portion located at the periphery of the decoder and readily accessible. Conductors deposited on the body 150, and insulated therefrom, can make contact with these electrodes without crossing over any other element. The same is true of all of the drain electrodes 124*a* . . . 124*h*.

However, none of the other gate electrodes 126*b* . . . 126*g*, 126*j* and 126*k* has a portion located at the periphery of the decoder. Connections to these latter electrodes could be brought out to a top or bottom edge of the decoder by first depositing a layer of insulating material, such as silicon dioxide, on top of the gate electrodes 126*a* . . . 126*l*. Portions of the insulator then could be etched away at areas overlying each of the electrodes to which a connection is desired. Finally, conductors could be deposited on top of the insulator, each conductor making contact with a different electrode at the area where the insulator was etched away, with the conductors extending to an edge of the decoder.

The aforementioned method of making the interconnections has several undesirable features. First, three extra processing steps are required during the fabrication, namely (1) depositing the insulator, (2) etching the insulator, and (3) depositing the conductors. Secondly, the extra processing steps require additional masks, which are expensive. Third, various ones of the conductors would overlie gate electrodes other than those to which they are connected. Since these conductors carry gate voltages, they might operate as gate electrodes and cause faulty operation of the decoder.

Figure 6:
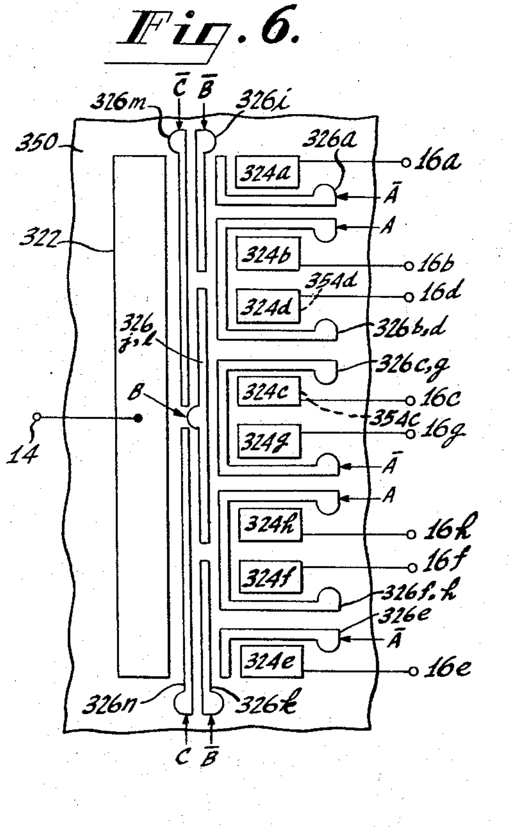
FIGURE 6 is a plan view of still another embodiment of the invention, including a novel gate arrangement for ease of making circuit interconnections.

An interconnection technique which does not suffer the above-mentioned disadvantages is shown in the embodiment of the invention illustrated in FIGURE 6. In FIGURE 6, the various elements of the decoder are given reference characters in the 300 series. The reference characters for various elements have the same tens and units digits and alphabetic character as have the reference characters of functionally equivalent elements in FIGURES 1, 2 and 4.

The FIGURE 6 decoder employs a single, common source electrode 322 and a plurality of spaced drain and associated drain electrodes 324*a* . . . 324*h*. The gate electrode arrangement has been changed in the FIGURE 6 device. In the central bank of gate electrodes, for example, only three gate electrodes 326*i*, 326*jl* and 326*k*, in that order from top to bottom, are employed whereas four electrodes 126*i* . . . 126*l* are used in FIGURE 2. The electrode arrangement in FIGURE 6 is equivalent to interchanging the electrodes 126*k* and 126*l* in FIGURE 2, and then combining 126*j* and 126*l* into a single, elongated electrode. This is made possible by the fact that both of the electrodes 126*j* and 126*l* receive the same input signal B. Additionally, various ones of the gate electrodes in the third bank are rearranged and combined into single, integral electrodes, and the drain electrodes also are rearranged functionally. As a result, it will be noted that the sequence of output junctions 16*a* . . . 16*h* in FIGURE 6 differs from that in FIGURE 1. By this functional rearrangement, several of the gate electrodes, e.g., 326*b* and 326*d*, 326*c* and 326*g*, can be combined into single, elongated electrodes, with the result that less interconnections are required.

An important feature of the FIGURE 6 device is the manner in which the gate electrodes 326*a* . . . 326*h* are brought out to the right edge of the decoder. This is accomplished by extending each of these gate electrodes to overlie and be insulated from a portion of body 350 between a pair of neighboring drains. For example, the portion of gate electrode 326*c*, *g* associated with drain 354*c* and drain electrode 324*c* is extended to overlie and be insulated from a portion of the body 350 between the associated drain 354*c* and the neighboring drain 354*d* and drain electrode 324*d*. In addition, however, the portion of the gate electrode 326*b*, *d* associated with that neighboring drain 354*d* and drain electrode 324*d* also is extended to overlie and be insulated from a portion of the body 350 between the same drains 354*c* and 354*d*.

Note that complementary signals are applied to these two different gate electrodes. Signal A is applied to electrode 326*b*, *d* and signal $\overline{A}$ is applied to electrode 326*c*, *g*. Accordingly, one or the other of these electrodes is at ground potential. This is important for the reason that there never can be a low impedance path between the neighboring drains due to gate action. If the gates were brought out singly between neighboring drains, and one drain were at ground potential, a voltage of +V volts on the single gate electrode would result in a low impedance conduction path in the body 350 to the neighboring drain, and the voltage at that neighboring drain would fall close to ground potential. It is for this reason that the gate extensions are not brought out singly between adjacent drains, but are brought out either in pairs, as are the electrodes 326*b*, *d* and 326*c*, *g*, or not at all, as in the area between drain electrodes 324*c* and 324*g*. This method of extending gate electrodes between neighboring drains is in no way limited to decoder applications.

That the FIGURE 6 decoder and the FIGURE 1 decoder are functionally equivalent can be seen by considering a few examples. When $\overline{C}$, $\overline{B}$ and $\overline{A}$ are +V volts, there is a low impedance path between source electrode 322 and drain electrode 324*a*, and the voltage at output junction 16*a* is zero. At least one gate electrode of the electrode sets overlying all other conduction paths is at ground potential, whereby all of the other output junctions 16*b* . . . 16*h* have a value equal to the battery 30 (FIGURE 1) voltage. When $\overline{C}$, $\overline{B}$ and A are +V volts, there is a low impedance path between source electrode 322 and drain electrode 324*b*, and the voltage at output junction 16*b* is ground potential. By similar analysis, it can be verified that an output (zero volts) appears at a different one of the output junctions 16*a* . . . 16*h* for each different set of register 40 outputs. The input and output conditions are exactly the same as those listed above in Table I.

Figures 7, 8:
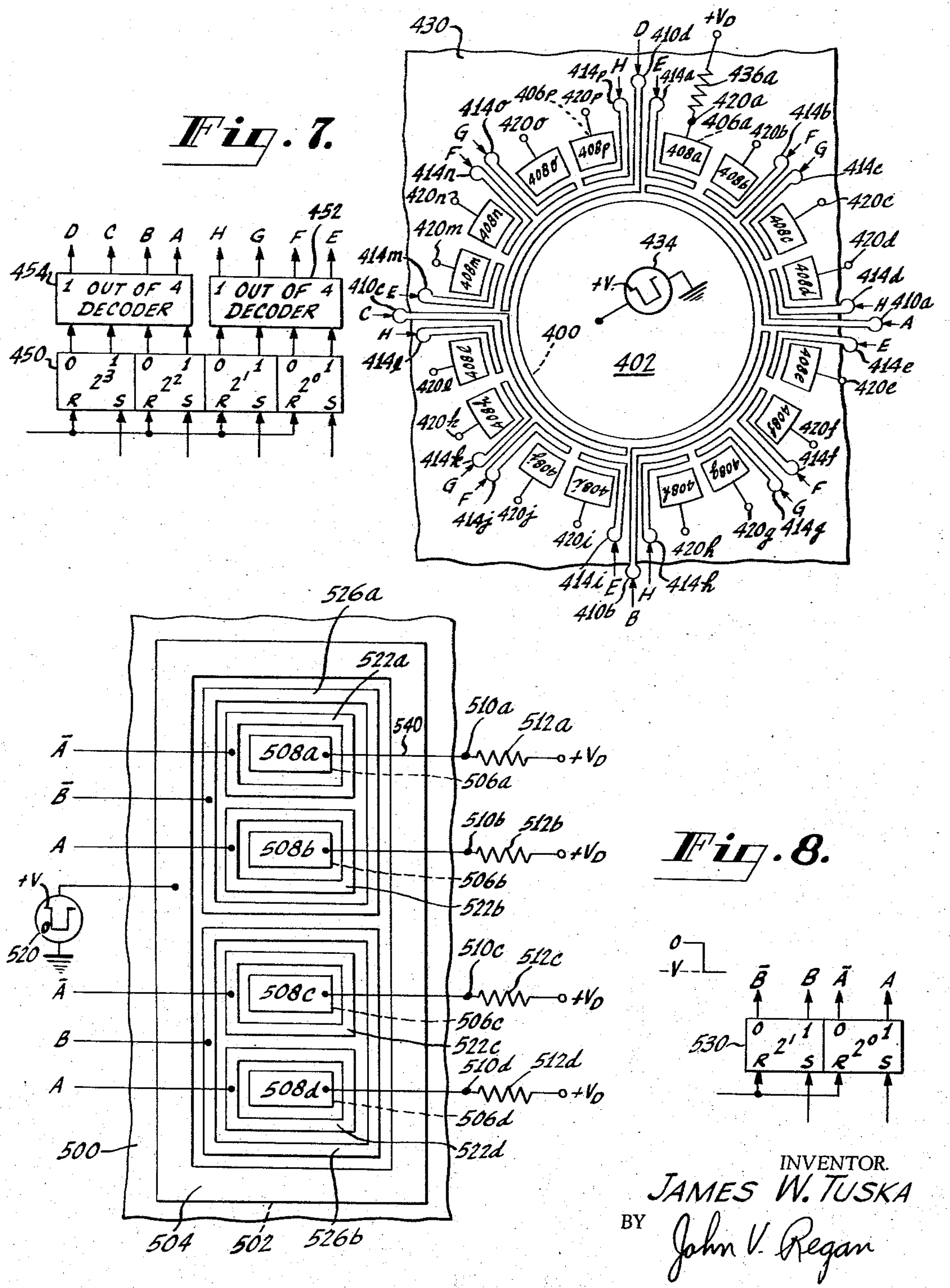
FIGURE 7 is a plan view of a quaternary decoder embodying the invention.
FIGURE 8 is a plan view of still another decoder unit embodying the invention and employing depletion type field-effect devices.

FIGURE 7 is a two-level quaternary decoder embodying the invention. The common source 400 is circular in shape and has deposited thereon a circular source electrode 402. Sixteen drains 406*a* . . . 406*p* are spaced equidistant from common source 400 and each has a metallic drain electrode 408*a* . . . 408*p*, respectively, deposited thereon. There are four elongated gate electrodes 410*a* . . . 410*d* which lie on a path concentric with the common source 400, there being a space between successive ones of the electrodes 410*a* . . . 410*d*. Each of these electrodes overlies and is insulated from a mutually exclusive set of four drain-to-source conduction paths. For reasons mentioned previously, each of these electrodes preferably overlies and is insulated from a portion of common source 400 also, although for purposes of clarity of drawing this is not shown.

Sixteen gate electrodes 414*a* . . . 414*p* lie along another path concentric with common source 400 and are spaced from one another. Each of these electrodes 414*a* . . . 414*p* overlies a portion of a different drain-to-source conduction path and is insulated therefrom. Preferably each of these electrodes also overlies and is insulated from a portion of its associated drain and a portion of the adjacent one of the gates 410*a* . . . 410*d*. Connections to all of the gate electrodes 410*a* . . . 410*d* and 414*a* . . . 414*p* are made by way of gate extensions of the type illustrated in FIGURE 6 and described previously. For example, each of the gate electrodes 414*a* . . . 414*p* which is next adjacent a drain has an extension which overlies and is insulated from a portion of the semiconductive body 430 between its drain and a neighboring drain. The gate electrode next adjacent that neighboring drain has its extension overlying and insulated from a portion of the body between the same pair of drains. For example, the extensions of the gate electrodes 414*a* and 414*p* overlie and are insulated from portions of the body 430 between the drains 406*a* and 406*p*. Each of the larger electrodes 410*a* . . . 410*d* has its extension brought out in the same area as the extensions of a pair of the gate electrodes 414*a* . . . 414*p*. Thus, the extensions of gate electrodes 410*d*, 414*a* and 414*p* overlie and are insulated from each other and from a portion of the body 430 between drains 406*a* and 406*p*.

It will be noted in FIGURE 7 that there are either two gate extensions, three gate extensions or no gate extensions overlying the body between a neighboring pair of drains. Assuming enhancement type units, there will not be a low impedance path between any pair of neighboring drains if at least one gate extension of each set is at ground potential. That this is always the case in a quaternary decoder will become clear as the discussion proceeds.

A control device 434 may be connected between source electrode 402 and circuit ground. This device 434, shown within the source area for convenience of drawing, supplies a voltage of ground potential during a decode operation and supplies a voltage of +V volts at other times. A separate resistor may be connected between each output junction 420*a* . . . 420*p* and a source of $+V_D$ volts operating potential. Only the resistor 436*a* is shown in the drawing.

Input signals A, B, C and D are applied to the gate electrodes 410*a* . . . 410*d*, respectively, in the first gate level. An input signal may have a value of +V volts or zero volts, but only one of the signals A, B, C, D is +V volts at any one time. Likewise, only one of the input signals E, F, G, H applied to the gates 414*a* . . . 414*p* in the second gate level has the value +V volts at any time. The source of these signals is not of concern here. However, to make the description complete, the signal source is illustrated as a four stage binary register 450 and a pair of one-out-of-four decoders 452, 454. Decoder 452 receives the (1) and (0) outputs of the $2^0$ and $2^1$ stages of register 450 and has an output of +V volts at one of the E, F, G, H outputs, and zero volts on the other three outputs. Decoder 454 receives the (1) and (0) outputs of the $2^2$ and $2^3$ stages of register 450 and has an output of +V volts on one of its output lines A, B, C, D, the other outputs being zero volts.

When decoder inputs A and E are +V volts, there is a low impedance path between common source 400 and the drain 406*a*, and the voltage at output junction 420*a* is zero. The sixteen possible input and output conditions are summarized in the following table.

TABLE II

| Inputs | | | | | | | | Output |
|---|---|---|---|---|---|---|---|---|
| D | C | B | A | H | G | F | E | |
| 0 | 0 | 0 | +V | 0 | 0 | 0 | +V | 420a |
| 0 | 0 | 0 | +V | 0 | 0 | +V | 0 | 420b |
| 0 | 0 | 0 | +V | 0 | +V | 0 | 0 | 420c |
| 0 | 0 | 0 | +V | +V | 0 | 0 | 0 | 420d |
| 0 | 0 | +V | 0 | 0 | 0 | 0 | +V | 420e |
| 0 | 0 | +V | 0 | 0 | 0 | +V | 0 | 420f |
| 0 | 0 | +V | 0 | 0 | +V | 0 | 0 | 420g |
| 0 | 0 | +V | 0 | +V | 0 | 0 | 0 | 420h |
| 0 | +V | 0 | 0 | 0 | 0 | 0 | +V | 420i |
| 0 | +V | 0 | 0 | 0 | 0 | +V | 0 | 420j |
| 0 | +V | 0 | 0 | 0 | +V | 0 | 0 | 420k |
| 0 | +V | 0 | 0 | +V | 0 | 0 | 0 | 420l |
| +V | 0 | 0 | 0 | 0 | 0 | 0 | +V | 420m |
| +V | 0 | 0 | 0 | 0 | 0 | +V | 0 | 420n |
| +V | 0 | 0 | 0 | 0 | +V | 0 | 0 | 420o |
| +V | 0 | 0 | 0 | +V | 0 | 0 | 0 | 420p |

FIGURE 8 is an embodiment of a one-out-of-four decoder embodying the invention and employing insulated-gate, field-effect units of the depletion type. The decoder comprises a body 500 of p-type conductivity having a "hollow" rectangular source 502 covered by a metallic source electrode 504. Four drains 506*a* . . . 506*d* contact different portions of body 500 at locations within the area enclosed by rectangular source 502, and have metallic drain electrodes 508a . . . 508d, respectively. Each of these electrodes is connected to a separate output junction 510*a* . . . 510*d*, respectively, and through a separate resistor 512*a* . . . 512*d*, respectively, to a source $+V_D$ of suitable operating potential. A control input source 520 is connected between common source electrode 504 and circuit ground. Source 520 supplies a voltage of zero volts during a decoding operation, and may supply a voltage of +V volts at other times, where $V<V_D$, the drain operating potential.

A first, hollow rectangular gate electrode 522*a* is insulated from and overlies portions of body 500 completely surrounding drain 506*a*. Gate electrodes 522*b* . . . 522*d* are insulated from and overlie portions of body 500 completely surrounding drains 506*b* . . . 506*d*, respectively. A fifth, hollow rectangular gate electrode 526*a* is insulated from and overlies body 500 at locations surrounding drains 506*a* and *b* and gate electrodes 522*a* and *b*. A sixth gate electrode 526*b* similarly is insulated from and overlies portions of body 500 completely surrounding drains 506*c* and 506*d* and gate electrodes 522*c* and 522*d*. Since the transistors are depletion type units, the various gate electrodes are designed to completely enclose the drains 506*a* . . . 506*d* to prevent sneak conduction paths during operation. By this means, all conduction paths between common source 502 and any drain are covered by at least two gate electrodes.

Input signals $\overline{A}$ are applied to gate electrodes 522*a* and 522*c*, and the complement signals A are applied to gate electrodes 522*b* and 522*d*. Input signals B are applied to gate electrode 526*b*, and the complement signals $\overline{B}$ are applied to gate electrode 526*a*. These signals may be provided by a pair of bistable stages in a register 530.

As mentioned previously, the conduction path in a depletion type insulated-gate, field-effect transistor has a low impedance when the gate and source voltages are equal, and has a high impedance when the gate voltage is sufficiently negative relative to the source voltage in an n-type unit. Since the control input voltage, at source electrode 504, is either zero volts or +V volts, the register 530 preferably is one which supplies output signals of zero volts or —V volts.

Consider now the operation of the decoder. The highest voltage supplied by register 530 to any gate electrode is zero volts. When control input source 520 is supplying a voltage of +V volts, all of the gate electrodes are less positive than the voltage at common source electrode 504 by at least V volts, which is selected in value to assure that all of the source-to-drain conduction paths have a very high impedance for this operating condition. Accordingly, the voltage at each of the output junctions 510*a* . . . 510*d* is $+V_D$ volts.

The control voltage supplied by input source 520 is switched to ground potential when it is desired to perform a decoding operation. Let the A and B outputs of register 530 be —V volts and the complements $\overline{A}$ and $\overline{B}$ be zero volts. Both of the gate electrodes 522*a* and 526*a* then are at the same potential as common source electrode 504, and the conduction path between source 502 and drain 506*a* has a low impedance, whereby the voltage at output junction 510*a* is close to ground potential. At least one of the gate electrodes overlying each of the other source-to-drain conduction paths is receiving a voltage of —V volts at this time. For example, the gate electrode 522*b* enclosing drain 506*b*, gate electrode 522*d* enclosing drain 506*d*, and gate electrode 526*b* enclosing drains 506*c* and 506*d* are at —V volts. Accordingly, the associated conduction paths have high impedances, and the voltage at each of the output junctions 510*b* . . . 510*d* is $+V_D$ volts. By similar reasoning, it can be verified that only one source-to-drain conduction path has the low impedance state for any given set of register 530 outputs, and that the particular low impedance path is different for each different set of register outputs.

A depletion type decoder does not have as simple a geometry as a decoder employing enhancement type devices (FIGURES 2, 4, 6, 7). This is due primarily to the fact that the source 502 and the various gate electrodes are preferably closed structures completely surrounding the drains. Also, because of the closed elements, all interconnections to the drain and gate electrodes must cross over other elements and be insulated therefrom. This requires additional processing steps. For example, the interconnection 540 between drain electrode 508*a* and output junction 510*a* crosses over gate electrodes 522*a* and 526*a* and source electrode 504. In some applications, however, depletion type units may be preferred.

Although the various embodiments have been illustrated as being of the MOS type, it should be understood that TFT devices could be employed in the alternative. Also bodies of n-type semiconductive material could be used instead of p-type material, provided that the usual changes are made in the supply voltages and signal levels.

What is claimed is:

1. The combination comprising:
- a body of semiconductive material;
- a common source and a plurality of drains contacting said body;
- each of said drains defining one end of a different conduction path in said body, and said common source defining the other end of each said conduction path;

- a different set of gate electrodes located along and being insulated from each different conduction path;
- the gate electrode in each set that is closest to its associated drain having a continuation that extends over, and is insulated from, a portion of said body between said associated drain and a neighboring drain, with the gate electrode that is associated with and closest to said neighboring drain also having its continuation extending over, and being insulated from, a portion of the body between same said associated drain and said neighboring drain; and
- the number of gate continuations between any two neighboring drains being other than one.

2. The combination comprising:
- a body of semiconductive material;
- a common source and a plurality of drains contacting said body;
- each of said drains defining one end of a different conduction path in said body, and said common source defining the other end of each said conduction path;
- a different set of gate electrodes located along and being insulated from each different conduction path;
- the gate electrode in each set that is closest to its associated drain having a continuation that extends over, and is insulated from, a portion of said body between said associated drain and a neighboring drain with the gate electrode that is associated with and closest to said neighboring drain having its continuation extending over, and being insulated from, a portion of the body between the same said associated drain and said neighboring drain;
- the number of gate continuations between any two neighboring drains being other than one; and
- at least one other gate electrode of each set being integral with a gate electrode of at least one other set.

3. The combination with a body of semiconductive material, and a plurality of drains in contact therewith each defining one end of a different conduction path in said body, of:
- a different gate electrode insulated from and overlying each different said conduction path;
- each said gate electrode also having an extension extending over and being insulated from a portion of said body between its associated drain and a neighboring drain, with the gate electrode associated with the neighboring drain also extending over, and being insulated from a portion of said body between said associated drain and said neighboring drain; and
- the number of gate extensions between any two neighboring drains being other than one.

4. The combination comprising:
- a body of semiconductive material;
- a common source and $2^n$ drains contacting said body, where $n$ is an integer greater than one, each drain defining one end of a different, mutually exclusive conduction path in said body and said common source defining the other end of each said conduction path;
- $n$ pairs of input lines;
- means for applying to one line of each of the $n$ pairs signals representing a binary "one" and for applying to the other line of each of the $n$ pairs signals representing a binary "zero";
- $2^n$ sets of $n$ gate electrodes each, each different set of gate electrodes overlying and being insulated from a different conduction path;
- means coupling each of the $n$ gate electrodes of a set to a different one of the input lines, where each of the latter lines belongs to a different one of the $n$ pairs of lines, and with the gate electrodes of each different set being coupled to a different combination of input lines; and
- $n—1$ of the gate electrodes of each set each being integral respectively with at least one other gate electrode of another set.

5. The combination comprising:
a body of semiconductive material;
a common source and sixteen spaced drains in contact with said body, each of said drains defining one end of a different conduction path in said body and said common source defining the other end of each conduction path;
a first set of four gate electrodes each being insulated from and overlying a different, mutually exclusive group of four successive conduction paths;
four other sets of four gate electrodes each, each of the latter sets being associated with a different one of the mutually exclusive groups of four conduction paths, and each of the four gate electrodes of a latter set overlying and being insulated from a different conduction path in the associated group; and
means for applying input signals to a single one of the gates in the first set and to one gate electrode of each of said four other sets at any one time.

6. The combination as claimed in claim 5, wherein each gate electrode has an extension which overlies and is insulated from a portion of said body between two neighboring drains, the extensions being located so that the number of gate extensions between any two neighboring drains is other than one.

7. The combination comprising:
a body of semiconductive material;
a common source and a plurality of drains contacting said body;
each of said drains defining one end of a different conduction path in said body, and said common source defining the other end of each of the conduction paths;
a first gate electrode insulated from said body and overlying a portion of each of said conduction paths;
a second gate electrode insulated from said body and overlying a portion of each of a first set of two conduction paths;
a third gate electrode insulated from said body and overlying a portion of each of a second set of two conduction paths; and
a plurality of other gate electrodes, one for each conduction path, insulated from said body and each overlying a portion of its respective conduction path.

8. The combination as claimed in claim 7, wherein the first and second sets of conduction paths are mutually exclusive.

References Cited

UNITED STATES PATENTS

| | | | |
|---|---|---|---|
| 3,005,937 | 10/1961 | Wallmark et al. | 307—88.5 |
| 3,233,123 | 2/1966 | Heiman | 307—88.5 |
| 3,258,663 | 6/1966 | Weimer | 307—88.5 |

ARTHUR GAUSS, *Primary Examiner.*

D. D. FORRER, *Assistant Examiner.*